(12) United States Patent
Veits

(10) Patent No.: US 7,965,723 B2
(45) Date of Patent: Jun. 21, 2011

(54) METHOD AND APPARATUS FOR DATA TRAFFIC SMOOTHING

(75) Inventor: Oliver Veits, Dachau (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 329 days.

(21) Appl. No.: 12/225,562

(22) PCT Filed: Jan. 10, 2007

(86) PCT No.: PCT/EP2007/050224
§ 371 (c)(1),
(2), (4) Date: Sep. 24, 2008

(87) PCT Pub. No.: WO2007/113013
PCT Pub. Date: Oct. 11, 2007

(65) Prior Publication Data
US 2009/0168792 A1 Jul. 2, 2009

(30) Foreign Application Priority Data
Mar. 31, 2006 (DE) .......................... 10 2006 015 046

(51) Int. Cl.
*H04L 12/28* (2006.01)
(52) U.S. Cl. .................... 370/401; 370/230.1; 370/428; 370/412; 370/466
(58) Field of Classification Search .................. None
See application file for complete search history.

(56) References Cited

U.S. PATENT DOCUMENTS

| 6,757,249 | B1 | 6/2004 | Kejriwal et al. | |
| 7,349,417 | B2* | 3/2008 | Nakagawa | 370/412 |
| 2003/0108063 | A1* | 6/2003 | Joseph et al. | 370/465 |
| 2003/0152076 | A1* | 8/2003 | Lee et al. | 370/389 |
| 2005/0220093 | A1* | 10/2005 | Chen et al. | 370/389 |
| 2007/0058656 | A1* | 3/2007 | Breslow et al. | 370/437 |

FOREIGN PATENT DOCUMENTS

| DE | 10306293 A1 | 9/2004 |
| EP | 1126666 A2 | 8/2001 |
| WO | WO 0230064 A1 | 4/2002 |
| WO | WO 0241642 A2 | 5/2002 |
| WO | WO 2004073265 A1 | 8/2004 |

OTHER PUBLICATIONS

Blouin et al.; "Performance Evaluation of Rate Control and QoS Capabilities of BRAS", IEEE Communications Society Globecom Workshops, 2004, pp. 293-301; Others; 2004.

* cited by examiner

*Primary Examiner* — Duc C Ho
(74) *Attorney, Agent, or Firm* — Buchanan Ingersoll & Rooney PC

(57) ABSTRACT

A method and device for data traffic smoothing are provided. Arriving data packets are buffer-stored and passed on by taking account of an overhead of management information which is attached to the data packet in a protocol conversion process, which is carried out later. This protocol conversion process is carried out at a later time, for example by a DSL modem. The data transmission rate measured from the point of view of the network element carrying out the data traffic smoothing is not the criterion to be adjusted, but the data transmission rate after protocol conversion. A quality of service both for low and high data packet lengths is ensured, and the bandwidth of a DSL connection can therefore be exploited fully both for the VOIP and for data transmission.

18 Claims, 2 Drawing Sheets

METHOD AND APPARATUS FOR DATA TRAFFIC SMOOTHING

CROSS REFERENCE TO RELATED APPLICATIONS

This application is the US National Stage of International Application No. PCT/EP2007/050224, filed Jan. 10, 2007 and claims the benefit thereof. The International Application claims the benefits of German application No. 10 2006 015 046.5 DE filed Mar. 31, 2006, both of the applications are incorporated by reference herein in their entirety.

FIELD OF INVENTION

The invention relates to a method and apparatus for data traffic smoothing.

BACKGROUND OF INVENTION

Methods and apparatuses for data traffic smoothing or shaping are already known in the prior art. One aim of such methods is to regulate a data transmission rate with the aim of the most continuous data transfer possible without loss.

The deployment of such methods for data traffic smoothing is recommended for example when forwarding data packets by way of network elements, such as routers for example. Data packets arriving at an input of such a network element with a variable transmission rate are hereby transferred to an output of the apparatus in such a manner that the data transmission rate at the output is ideally constant but at least has an upward limit.

With such network elements it is frequently the case that data packets arriving at the input arrive with a high data transmission rate, while only a lower data transmission rate can be achieved or permitted at the output. The network element here has a buffer for buffering data packets until they are forwarded.

A lower data transmission rate requirement at the output may be offered for example by a transmission element connected to the network element that can only process a limited data transmission rate.

A known method for data traffic smoothing is the token bucket method. To implement this method using corresponding software, provision is made for the periodic generation of tokens, which fall figuratively into a bucket. With the method a specific number of data packets can pass through the apparatus for one token in the bucket, the token being deleted or removed from the bucket when the number of data packets provided for has passed through. The number of data packets that can pass through the apparatus per token corresponds to a data packet transmission rate. This can generally be set by changing the time period of newly generated tokens.

SUMMARY OF INVENTION

The measures known to date for traffic smoothing at a network element have a problem for example in that no data packet transmission rate setting is optimal for all data packet lengths.

This problem becomes clearer if we consider the transmission element mentioned in the introduction, which is connected to the network element and can only process a limited data transmission rate. Limiting results for example due to a limited data transmission rate requirement at the output of the transmission element, which thus also has a retroactive effect on the input of the transmission element connected to the network element. Such network elements provide for a rejection of data packets, when the incoming data transmission rate threatens to exceed the permissible data transmission rate at the output. Rejected data packets are hereby not forwarded to the output but are deleted instead.

If a protocol conversion is carried out in the transmission element, the received data packets are provided with further data management elements in the known manner before being forwarded, said data management elements being referred to as overheads in specialist circles.

Part of the protocol conversion can then also be a change in transmission mode. For example the useful information to be transported with the data packets in the data packets of variable data packet length arriving at the transmission element can be restructured in such a manner that only data packets with a constant data packet length are provided at the output of the transmission element. For incoming data packets, whose length is shorter than that of the outgoing data packets of constant length, there is provision for filling up with arbitrary filler bits, which do not contain any information. This filling up procedure is also referred to as padding in specialist circles. These filler bits are also data management elements and therefore an overhead in respect of the useful information to be transported with the data packets. The useful information of a data packet is also referred to as payload in specialist circles.

The data management elements, for example filler bits, headers or trailers, added to a data packet in the transmission element therefore bring about a data transmission rate at the output, which is not proportional to the data packet transmission rate that can be set at the network element due to the differing lengths of the data packets.

Therefore the problem set out in the introduction that no data packet transmission rate setting is optimal for all data packet lengths is clear. For a given data packet transmission rate of the network element, the overhead generated in the transmission element for short data packet lengths is longer than that for longer data packet lengths. A "cautious" low setting of the data packet transmission rate, which anticipates a regular high occurrence—or even irregularly occurring peaks—of data packets of short packet length, would result in inefficient utilization of the data throughput for data packets of long packet length. Conversely for data packets of long data packet length a higher data packet transmission rate could be set at the network element, while the same data packet transfer rate would result in the rejection of data packets for short data packet lengths.

The object of the invention is to specify a method, with which it is possible to achieve efficient data traffic smoothing with simple means, which is not a function of the data packet length of the forwarded data packets.

The object is achieved by a method with the features of the independent claims.

The invention develops a known method for data traffic smoothing in that an overhead in the form of management information is taken into account, being attached to the data packet in a subsequent protocol conversion.

The method, which is developed with the inventive means, provides for the buffering and forwarding of incoming data packets based on a queue method. Such a queue method is designed for example according to the FIFO (First In First Out) principle and provides for a controlled forwarding of data packets according to a predefinable data packet transmission rate. The data packet transmission rate here corresponds to a number of forwarded data packets per unit of time.

The inventive development of this method solves the problem of different data packet lengths in that the data packet length a data packet will have after management information has been added during the course of a protocol conversion is determined before said data packet is forwarded. This protocol conversion is carried out at a later time, in other words after forwarding, for example by a transmission element arranged after a relevant network element. According to the invention the data packet is forwarded as a function of the determined anticipated data packet length.

This means for example that a number of data packets with short data packet length are not forwarded as quickly as would be anticipated according to methods for data traffic smoothing from the prior art, due to an anticipated longer overhead. This prevents data loss.

Conversely the inventive means can be used to forward data packets with long packet length just as quickly or even more quickly than would be anticipated according to methods for data traffic smoothing from the prior art, due an anticipated shorter overhead as described above.

The inventive method is therefore based on the idea that the criterion to be set is not the data transmission rate measured from the point of view of the network element carrying out the data traffic smoothing but the data transmission rate that would be measured after protocol conversion. In order to set such a data transmission rate, the known means for data traffic smoothing are retained and refined according to the invention, in that the data packet length is also taken into account in a subsequent protocol conversion.

The object is similarly achieved by the deployment of an apparatus with the features of the independent claims.

One important advantage of the inventive means is that a data throughput to be achieved is improved regardless of data packet size. With the methods known to date, a "cautious" low setting had to be set for the data packet transmission rate, anticipating a regular high occurrence—or even irregularly occurring peaks—of data packets with a short data packet length, to avoid data packet loss. In the case of data packets with a long data packet length, such a low setting for the data packet transmission rate would result in inefficient utilization of the data throughput.

A further important advantage of the inventive means is that when it is used when there is a high occurrence of data packets with short data packet lengths the rejection of data packets is excluded.

Further embodiments of the invention are set out in the subclaims.

One embodiment of the invention relates to the realization of the known queue method based on periodically generated tokens, for example according to a known token bucket method. A token is deleted after a settable number of data packets waiting in the queue has been forwarded. Alternatively a token is deleted after a settable quantity of data has been forwarded, for example 1 kByte. When the data throughput is low, periodically generated tokens are "stored" for a data packet transmission rate with an increasing data throughput.

One advantageous embodiment of the invention relates to the determination of the added management information and therefore the data packet length the data packet will have after management information has been added during the course of a protocol conversion. According to one embodiment of the invention at least one parameter can be set. It should be noted here that the quantity of anticipated added management information does not represent a fixed value but—as described above—is a function of the original data packet length. This function is generally linear but not necessarily proportional to the original data packet length. In addition to a proportional element this function also includes a constant parameter, which results from management information attached to the start or end of the converted data packet. Such management information arranged at the start or end is often referred to as a header or trailer and can for example contain a checksum to allow the completeness of the data in the data packet to be verified. According to another embodiment of the invention the parameter is transferred from the subsequent unit, in other words for example the transmission unit. Since the nature of the protocol conversion there generally remains the same for quite a long period of time, regular interrogation is generally not necessary.

A material embodiment of the invention provides for a network element to execute the inventive method, serving as a router embodied to link a computer to a broadband connection or DSL connection. The transmission element here is a separate DSL modem for example, which alternatively forms a unit with the router.

BRIEF DESCRIPTION OF THE DRAWINGS

An exemplary embodiment with further advantages and embodiments of the invention is described in more detail below with reference to the drawing, in which.

DETAILED DESCRIPTION OF INVENTION

The inventive method is described below by way of example with reference to a DSL connection (Digital Subscriber Line). Such a type of broadband connection is also used increasingly in homes for both voice communication and data communication. Voice communication by way of packet-oriented data networks is frequently referred to as VoIP or Voice over Internet Protocol.

For packet-oriented voice communication data packets, which contain the voice information, generally have to be exchanged with a higher priority between the computer or telephone and the connected data network than data packets, which are used for data communication. Means are known in the prior art, which characterize data packets for voice communication as time-critical in that these contain a corresponding identifier but such a differentiation between traffic classes (voice and data communication) has not as yet been used in all communication components.

Figure 1:
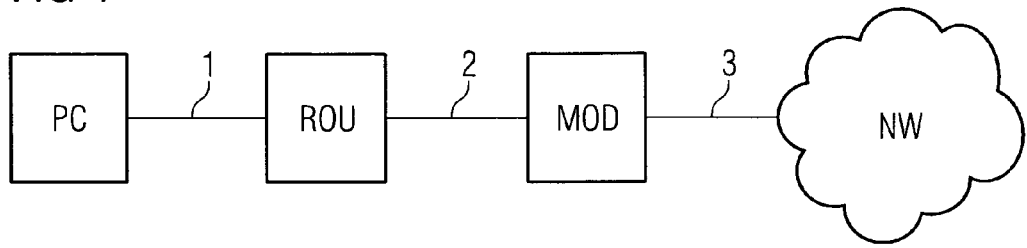
FIG. 1: shows a structural diagram to illustrate schematically a computer connection by way of a network element with a transmission element.

FIG. 1 shows a computer PC, which is connected by way of a first connection 1 to a router ROU. The router ROU is connected by way of a second connection 2 to a modem MOD, which in turn is connected by way of a third connection 3 to a packet-oriented network NW. The router ROU corresponds to a network element as referred to above.

The second connection 2, by way of which the router ROU is connected to the modem MOD, is generally embodied as Fast Ethernet. Such a connection mode or protocol ensures a maximum data transmission rate of 100 MBit/s. The data transmission rate of the third DSL connection 3 between the modem MOD and the packet-oriented network NW has to be kept much lower, depending on the embodiment of the connection 3. This bandwidth is therefore also referred to below as a bottleneck bandwidth, since it is a limiting factor for data communication for a DSL connection.

Data packets, which exceed the data transmission rate limited by the third connection 3 on the second connection 2, would therefore be rejected, in other words deleted, in the modem MOD. To avoid this data loss, a method for data traffic smoothing is implemented in the router ROU, in other words a network element within the meaning of the invention, limiting the data packet transmission rate in the direction of the connected transmission element, i.e. the modem MOD. The above-mentioned prioritization of data packets containing voice communication likewise means there is a need for data traffic smoothing.

One method for data traffic smoothing or shaping generally implemented in the router ROU provides for the implementation of a token bucket algorithm. Here a fixed data packet transmission rate is set at the router ROU, which can be used to send data packets to the modem MOD. It has been demonstrated that there is no fixed data rate that can be set, which would be equally suitable for all data packet lengths. In the case of data packets with a long data packet length, additionally attached management information (overheads) do not have as significant an impact as in the case of data packets with a short data packet length. Therefore a higher data packet rate is permissible for data packets with a long data packet length, while the same data packet transmission rate results in data packet losses in the modem MOD for data packets with a short data packet length.

Figure 3:
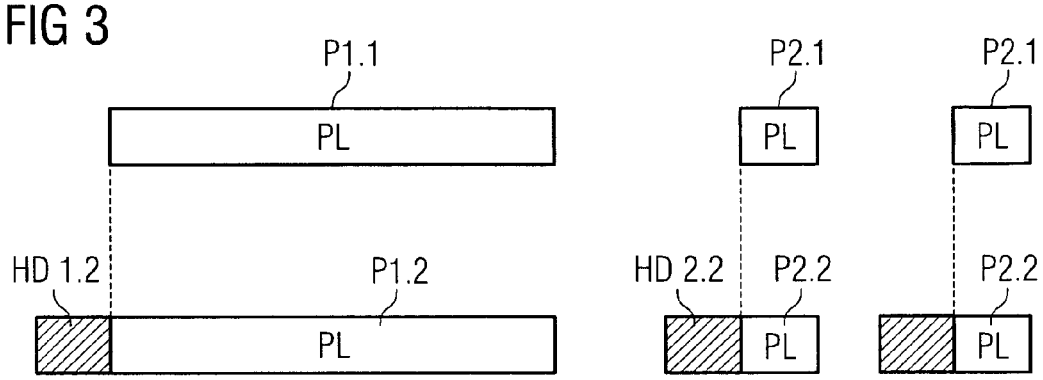
FIG. 3: shows a structural diagram to illustrate schematically the different impact of management information attached to data packets with different data packet lengths.

This effect is shown below with reference to FIG. 3. FIG. 3 shows a first data packet P1.1, with a payload element PL. This data packet P1.1 undergoes a protocol conversion. The data packet P1.2 resulting after the protocol conversion has an additional message header HD1.2 (shown hatched). The header HD1.2 is added to the original data packet P1.1 by the corresponding protocol conversion.

Two second data packets P2.1 are also shown, which are much smaller than the first data packet P1.1 in respect of their data packet length. A corresponding protocol conversion results in the addition of a second header HD2.2, which corresponds to the first header HD1.2 in respect of its size. In the case of short data packets all the management information, here the attached headers HD2.2, exceeds the relative proportion of management information in the case of long data packets.

A protocol conversion is described in more detail below with further reference to the functional units in the respectively preceding figures.

Figure 2:
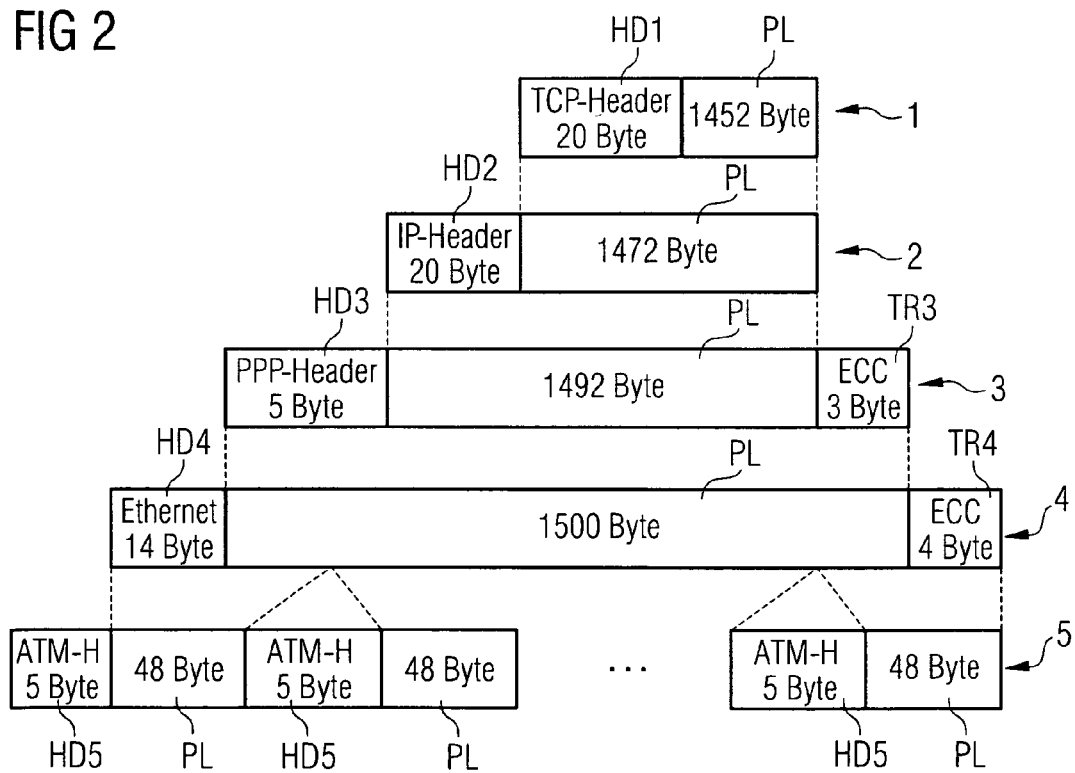
FIG. 2: shows a structural diagram to illustrate schematically a number of protocol conversions of a data packet.

FIG. 2 shows a number of protocol conversions applied to a first data packet 1. The first data packet 1 consists of a payload element PL with a length of 1452 bytes and a first header HD1 with a length of 20 bytes. The first header HD1 is inserted by the protocol TCP (Transmission Control Protocol).

In a second step 2 a second header HD2 of 20 bytes is inserted. The second header HD2 is added during the course of a protocol conversion to the protocol IP (Internet Protocol).

In a further third protocol conversion 3 a third header HD3 of 5 bytes is added according to the PPP (Point to Point Protocol). There is also provision for the insertion of a third trailer TR3 in this protocol. A trailer is a data management element, which is attached to the end of a data packet. The trailer generally contains information for identifying and correcting transmission errors. Such information assists for example with a cyclic redundancy check CRC.

In a fourth protocol conversion 4 a fourth header of 14 bytes is inserted. A fourth trailer TR4 of 4 bytes is also attached to the end of the data packet. The corresponding protocol conversion results in an Ethernet frame.

A fifth protocol conversion 5 results The fifth protocol conversion 5 results in an ATM protocol (Asynchronous Transfer Mode), wherein there is provision for a division of the data packet into a number of cells with a constant length of 53 bytes. The payload element PL of the former data packet with a widely variable length is divided into a number of payload elements PL with a constant length of 48 bytes. A header HD5 of 5 bytes is inserted in front of each payload element of 48 bytes. Data packets with a fixed length are generally referred to as frames. A further trailer (not shown in the drawing) is attached to the end of the last frame.

The ATM protocol corresponds to the protocol operated on the third connection described from FIG. 1 in a so-called AAL 5. AAL (Asynchronous Transfer Mode Adaption Layer) refers to a service class for a data transmission. The fifth service class AAL 5 is used to transmit data packets by way of ATM networks. For example the DSL modem MOD transmits data to the DSLAM by way of AAL5.

The element of the header added by the protocol conversion increases the length of the data packet, measured in relation to the original file length, in an essentially proportional manner. In contrast an attached trailer essentially brings about the addition of a constant element per data packet, so that data packets of differing sizes are extended by a constant element.

The protocol conversion to the ATM protocol carried out in the modem MOD therefore results in both a constant element which is independent of the data packet length and an element which is proportionally dependent on the data packet length.

The inventive method, which is implemented in the router ROU in the example in FIG. 1, now provides for a determination of the packet length a respective data packet in a queue will have after passing through the modem MOD, including the management information attached to the data packet. The management information is hereby made up of a constant element, which results from an ATM-layer-3 header, and a proportional element, which results from a layer-2-header.

According to the invention the data packet length a data packet will have after the addition of management information during the course of a protocol conversion is determined in the router ROU before said data packet is routed to the modem MOD.

The length of the added management information is determined for example on the basis of at least one settable and/or transferable parameter. This parameter is used for example in a calculation specification, which gives the anticipated overhead as a result of the protocol conversion as a function of the original data packet length.

Two parameters for example can be set with adequate accuracy, a first parameter characterizing the constant element of a management information length and a second parameter characterizing a proportional element, the latter being a function of the original data packet length.

As an alternative to setting, it is also advantageous to transfer the at least one parameter from the modem MOD to the router ROU.

A relative overhead is then defined for each data packet, resulting from a quotient between the calculated management information and the calculated data packet length after protocol conversion.

The data packet length thus calculated is used to modify the queue method, which is for example embodied according to the known token bucket method, for data traffic smoothing in the router ROU.

Figure 4:
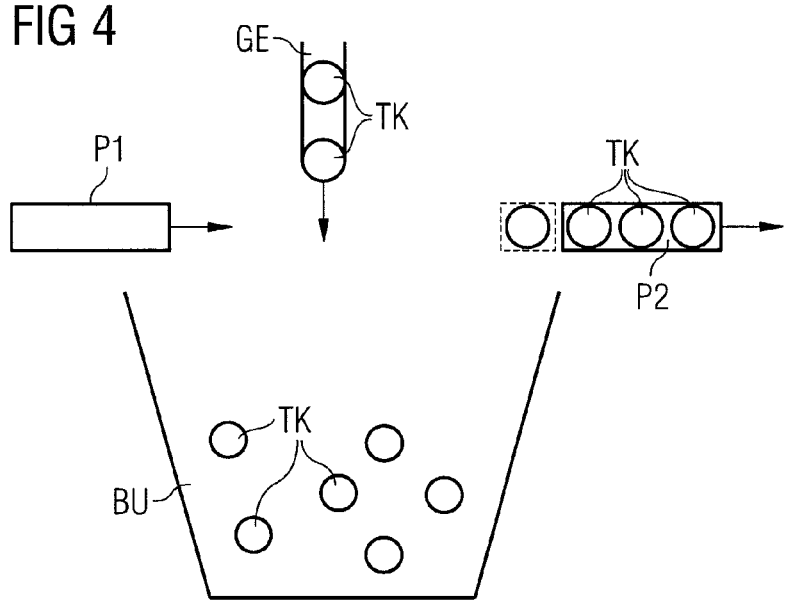
FIG. 4: shows a diagram of an inventively modified token bucket method.

FIG. 4 shows a figurative diagram of an inventively modified token bucket method. To implement this method using corresponding software, provision is made for a periodic generation of tokens TK by a figurative generation unit GE, the tokens being generated and then dropping into a figurative bucket BU and thus being stored for a situation where no forwarding of data packets initially takes place.

According to the token bucket method known to date a specific number of data bytes can pass through the apparatus for a token TK in the bucket BU, the token TK being deleted or removed from the bucket BU when the specified number of data bytes has passed through. The number of data bytes which can pass through the apparatus per token corresponds to a data transmission rate.

According to the invention this method is improved in that, when a data packet P1 arrives at an input (not shown) of the router ROU, the length the data packet P1 will have after passing through the subsequent modem MOD including all management information is calculated according to the above provisions. This length is shown in a figurative second data packet P2 on the right of the bucket, the management information being shown with a broken line. The second data packet P2 is fictional in that it is only treated as a computational variable in respect of the overall data packet length and is only present in the modem MOD with this data packet length after a protocol conversion. In contrast the first data packet P1 is present as a real data packet P1 for forwarding in the router ROU.

The fictional second data packet P2 is "filled" figuratively with tokens TK. This figurative representation symbolizes that the data packet P1 is forwarded as a function of the previously determined data packet length, in that tokens TK are deleted according to the anticipated length of the data packet P2.

If the data packet length of the fictional second data packet P2 exceeds the residual content of the bucket BU, the data packet P1 is not sent until the bucket BU contains a sufficient number of tokens TK. Otherwise the data packet P1 is sent and the data packet length of the fictional second data packet P2 is deducted from the content of the token bucket. This deducted data packet length is symbolized in the drawing by the tokens TK, with which the second data packet P2 is filled.

The inventive method has the advantage in particular that a quality of service is ensured for both short and long data packet lengths and the full bandwidth of the DSL connection can be fully utilized both for short and long data packet lengths.

The invention claimed is:

1. A method for data traffic smoothing comprising:
buffering at least one incoming data packet to be forwarded, the at least one data packet having a first length;
predicting a second length of the at least one data packet, the second length comprising the first length of the at least one data packet and management information to be added during a protocol conversion; and
forwarding the at least one data packet based on a queue method such that the at least one data packet is forwarded as a function of the predicted second length, the queue method for forwarding the at least one data packet being a token bucket method, the token bucket method comprising:
assigning tokens from a bucket to a data packet based on the second length of the at least one data packet:
if a residual content of tokens from the bucket is less than the tokens needed for filling the at least one data packet, not sending the at least one data packet until additional tokens are provided to the bucket for filling the at least one data packer; and
if the residual content of tokens from the bucket is sufficient to fill the at least one data packet, sending the at least one data packet and removing the assigned tokens from the bucket; and
wherein the protocol conversion occurs after forwarding the at least one data packet.

2. The method of claim 1, wherein the at least one data packet comprises data packets and wherein the queue method for forwarding the data packets periodically generates tokens and a token of the periodically generated tokens is deleted after a settable number of the data packets has been forwarded.

3. The method of claim 1, wherein the queue method periodically generates tokens, and at least one token of the periodically generated tokens is deleted after a settable quantity of data has been forwarded.

4. The method of claim 1, wherein the management information comprises at least one of a first portion of management information that is added based on the first length of the at least one data packet and a second portion of management information that is independent of the first length of the at least one data packet.

5. The method of claim 1 wherein the management information to be added during the protocol conversion is predicted for use in predicting the second length based on at least one of a proportional parameter and a constant parameter, the proportional parameter being a function of the first length, the constant parameter characterizing a constant element portion of the management information to be added during the protocol conversion that is independent of the first length.

6. The method of claim 5 wherein the constant parameter based on a header or a trailer.

7. The method of claim 1, wherein the predicting and forwarding is carried out by a network element and the management information is added to the at least one data packet by a transmission element that is connected to the network element.

8. A network element, comprising:
a memory for buffering at least one incoming data packet, the at least one data packet having a first length; and
a queue management for forwarding the at least one data packet based on a queue method, wherein the queue method for forwarding the at least one data packet is a token bucket method, the token bucket method comprising:
assigning tokens from a bucket to a data packet based on the second length of the at least one data packet:
if a residual content of tokens from the bucket is less than the tokens needed for filling the at least one data packet, not sending the at least one data packet until additional tokens are provided to the bucket for filling the at least one data packer; and
if the residual content of tokens from the bucket is sufficient to fill the at least one data packet, sending the at least one data packet and removing the assigned tokens from the bucket; and
wherein the at least one data packet is forwarded based on a second length of the at least one data packet, the second length comprising the first length of the at least one data packet and management information to be added during a protocol conversion;
wherein the protocol conversion occurs after the at least one data packet is forwarded.

9. The network element of claim 8, wherein the at least one data packet comprises data packets and wherein the queue management periodically generates tokens and a token of the periodically generated tokens is deleted after a settable quantity of the data packets has been forwarded.

10. The network element of claim 8, wherein the management information is added at a transmission element that is connected to the network element.

11. The network element of claim 8, wherein the network element comprises a router.

12. The network element of claim 11, wherein the network element is configured to be connected to a transmission element, the transmission element comprising a modem.

13. The network element as claimed in claim 11, wherein the router is configured to connect to a DSL modem.

14. The network element of claim 8, further comprising an integrated DSL modem.

15. The network element of claim 8 wherein the management information comprises at least one of a first portion of management information that is added based on the first length of the at least one data packet and a second portion of management information that is independent of the first length of the at least one data packet.

16. The network element of claim 8 wherein the management information to be added during the protocol conversion is based on at least one of a proportional parameter and a constant parameter, the proportional parameter being a function of the first length, the constant parameter characterizing a constant element portion of the management information to be added during the protocol conversion that is independent of the first length.

17. A network element comprising a router, the router comprising:

a memory for buffering at least one incoming data packet, the at least one data packet having a first length; and a queue management for forwarding the at least one data packet based on a queue method; and wherein the at least one data packet is forwarded based on a second length of the at least one data packet, the second length comprising the first length of the at least one data packet and management information to be added during a protocol conversion; and wherein the protocol conversion occurs after the at least one data packet is forwarded; and wherein the router connects to a DSL modem; and wherein the management information is added by the DSL modem.

18. A network element, comprising:

a memory for buffering at least one incoming data packet, the at least one data packet having a first length; and a queue management for forwarding the at least one data packet based on a queue method; and an integrated DSL modem; and wherein the at least one data packet is forwarded based on a second length of the at least one data packet, the second length comprising the first length of the at least one data packet and management information to be added during a protocol conversion;

wherein the protocol conversion occurs after the at least one data packet is forwarded;

wherein the management information is added by the DSL modem.

* * * * *